(12) United States Patent
Hartland (10) Patent No.: US 10,703,301 B2
(45) Date of Patent: Jul. 7, 2020

(54) BACKUP CAMERA ENABLING DEVICE

(71) Applicant: Derk Hartland, Lake Forest, CA (US)

(72) Inventor: Derk Hartland, Lake Forest, CA (US)

( * ) Notice: Subject to any disclaimer, the term of this patent is extended or adjusted under 35 U.S.C. 154(b) by 53 days.

(21) Appl. No.: 16/162,210

(22) Filed: Oct. 16, 2018

(65) Prior Publication Data
US 2019/0118729 A1    Apr. 25, 2019

Related U.S. Application Data

(60) Provisional application No. 62/575,073, filed on Oct. 20, 2017.

(51) Int. Cl.
*B60R 11/04*    (2006.01)
*B60J 5/10*    (2006.01)
*B60R 11/00*    (2006.01)

(52) U.S. Cl.
CPC ............. *B60R 11/04* (2013.01); *B60J 5/107* (2013.01); *B60R 2011/004* (2013.01); *B60R 2011/0049* (2013.01); *B60R 2011/0085* (2013.01); *B60R 2300/802* (2013.01); *B60R 2300/8046* (2013.01)

(58) Field of Classification Search
None
See application file for complete search history.

(56) References Cited

U.S. PATENT DOCUMENTS

| | | | |
|---|---|---|---|
| 6,717,610 B1* | 4/2004 | Bos | B60R 1/00 340/436 |
| 2016/0101728 A1* | 4/2016 | Chan | B60C 23/02 340/447 |
| 2016/0318456 A1* | 11/2016 | Moenig | B60R 11/04 |
| 2019/0113742 A1* | 4/2019 | Gaucher | G02B 27/0006 |

* cited by examiner

*Primary Examiner* — Dakshesh D Parikh

(57) ABSTRACT

The inventive subject matter comprises an add-on device that works on most pickup trucks and makes the backup camera functional when the tailgate is down. The device redirects the image of the existing backup camera without the need for wiring.

5 Claims, 9 Drawing Sheets

BACKUP CAMERA ENABLING DEVICE

CROSS REFERENCE TO RELATED APPLICATIONS

This application claims the benefit of U.S. Provisional Application No. 62/575,073, filed Oct. 20, 2017; which is incorporated by reference herein.

FIELD

The inventive subject matter is applicable to the field of motor vehicles. More specifically, to enable a backup camera while the tailgate is lowered on a pickup truck.

NOTE: Throughout this specification wherever the phrase used indicating redirecting the image, implies the light that provides the image for the backup camera is redirected.

BACKGROUND

Backup cameras or rear view cameras have been produced for the purpose of being attached to the rear of a vehicle to aid in backing up, to alleviate the rear blind spot, and specifically to avoid a backup collision.

The first production automobiles to incorporate backup cameras were in the early 1990's. Over the years, backup cameras became more common as factory accessories on passenger cars and trucks, as well as aftermarket accessories.

In a 2010 report, the U.S. National Highway Traffic Safety Administration (NHTSA) stated that each year 210 people die and 15,000 are injured in light-vehicle backup incidents, with about 31% of the deaths among kids under age 5 and 26% adults over 70.

In March of 2014, NHTSA announced that it would require all automobiles sold in the United States built beginning in May 2018 to include "rear-view visibility systems," in effect, requiring backup cameras. The rule follows an outcry from consumer groups and by families touched by tragic back-over accidents, especially those involving children.

The backup camera on a pickup truck is typically mounted on the back of the tailgate. Anytime the tailgate is down the backup camera is rotated 90 degrees from its original position. This means it is pointing down towards the ground and the backup camera is no longer usable. Furthermore, a pickup truck with a large load like a camper needs the backup camera more than ever as objects behind the truck are even more difficult-to-see. Unfortunately, most pickup trucks fitted with campers require the tailgate to be in the down position and the backup camera becomes inoperable.

Backup cameras on pickup trucks suffer from these disadvantages; therefore there remains a considerable need for an improved system that provides rear visibility anytime the tailgate is down. Accordingly, such a system is disclosed herein.

SUMMARY

The above-noted needs are overcome by the inventive subject matter which comprises an enabling device for a pickup truck backup camera, which is attached to the tailgate.

Anytime the tailgate is down the backup camera is rotated 90 degrees from its original position. This means it is pointing down towards the ground and the backup camera is no longer usable. Frequently, a pickup truck carrying a large load or a camper needs the tailgate in the down position. This is when the backup camera is needed more than ever as objects behind the truck are even more difficult-to-see.

The inventive subject matter comprises an add-on device that works on most pickup trucks and makes the backup camera functional again when the tailgate is down. The device redirects the image for the existing backup camera without wiring needed. The device is easy to install and quickly mounts to the tailgate. The device is removed when the tailgate is in the up-position.

Various features, functions, and advantages of the inventive subject matter will become more apparent from the following detailed description, which should be read in conjunction with the accompanying drawings.

BRIEF DESCRIPTION OF THE DRAWING

Having thus described various embodiments of the inventive subject matter in general terms, reference will now be made to the accompanying drawings, and:

These drawings illustrate, among other things, examples of embodiments of the inventive subject matter.

DETAILED DESCRIPTION

The above noted features, functions, and advantages of the inventive subject matter will now be described more fully hereinafter with reference to the accompanying drawings, in which various embodiments of the invention are shown. This description is intended merely to provide examples, and is not intended to limit the scope, application or configuration of the various embodiments of the backup camera enabling device.

The inventive subject matter comprises an enabling device for a motor vehicle backup camera, which is attached to the tailgate of a pickup truck. Anytime the tailgate is down the backup camera is rotated 90 degrees from its original position. This means it is pointing down towards the ground and the backup camera is no longer usable. The inventive subject matter comprises an add-on device that works on most pickup trucks and makes the backup camera functional again when the tailgate is down.

The drawings include reference numbers used in this section that refer to parts or all of the subject matter illustrated. For many of the reference numbers, however, that same reference number, and the component or aspect to which that number refers, can be found in other figures as well.

Figure 1:
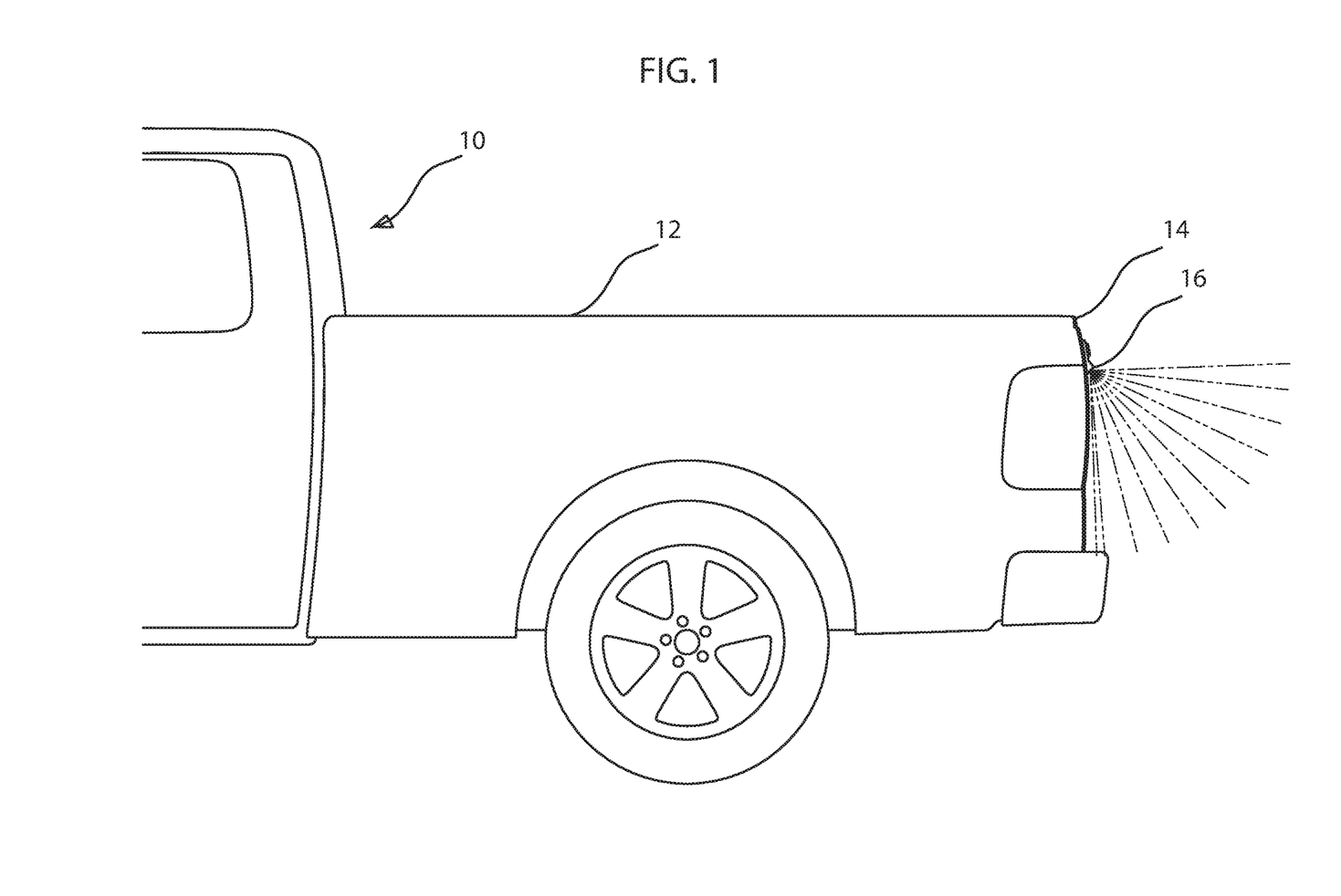
FIG. 1 illustrates a side view of a typical backup camera located on the tailgate of a pickup truck, with the tailgate in the up position.

Referring to the drawings, FIG. 1 illustrates an example of a pickup truck 10 that includes body 12, tailgate 14, and backup camera 16. Other components of pickup truck 10 have been omitted for clarity including the frame, suspension, and powertrain. Examples of such components and systems are known in the art. FIG. 1 is presented to show the projection of the backup camera 16 while the tailgate 14 is in the up position. The backup camera 16 is pointing rearward to capture images behind the pickup truck 10. The dotted lines represent the camera's projection.

Figure 2:
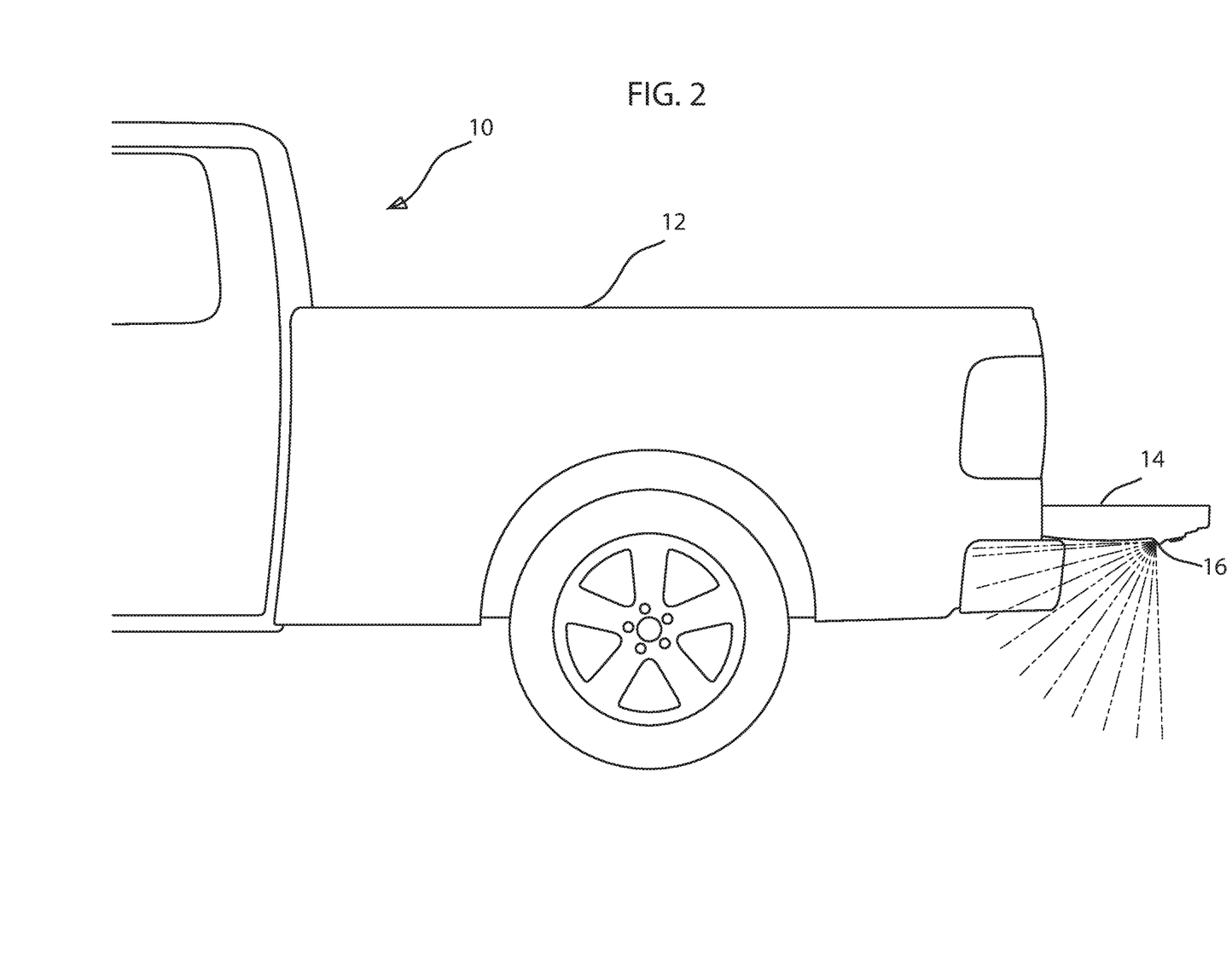
FIG. 2 illustrates a side view of a typical backup camera located on the tailgate of a pickup truck, with the tailgate in the down position.

FIG. 2 illustrates an example of a pickup truck 10 that includes body 12, tailgate 14, and backup camera 16. FIG. 2 is presented to show the projection of the backup camera 16 while the tailgate 14 is in the down position. The backup camera 16 is pointing downward toward the ground and is inoperable. The dotted lines represent the camera's projection.

Figure 3:
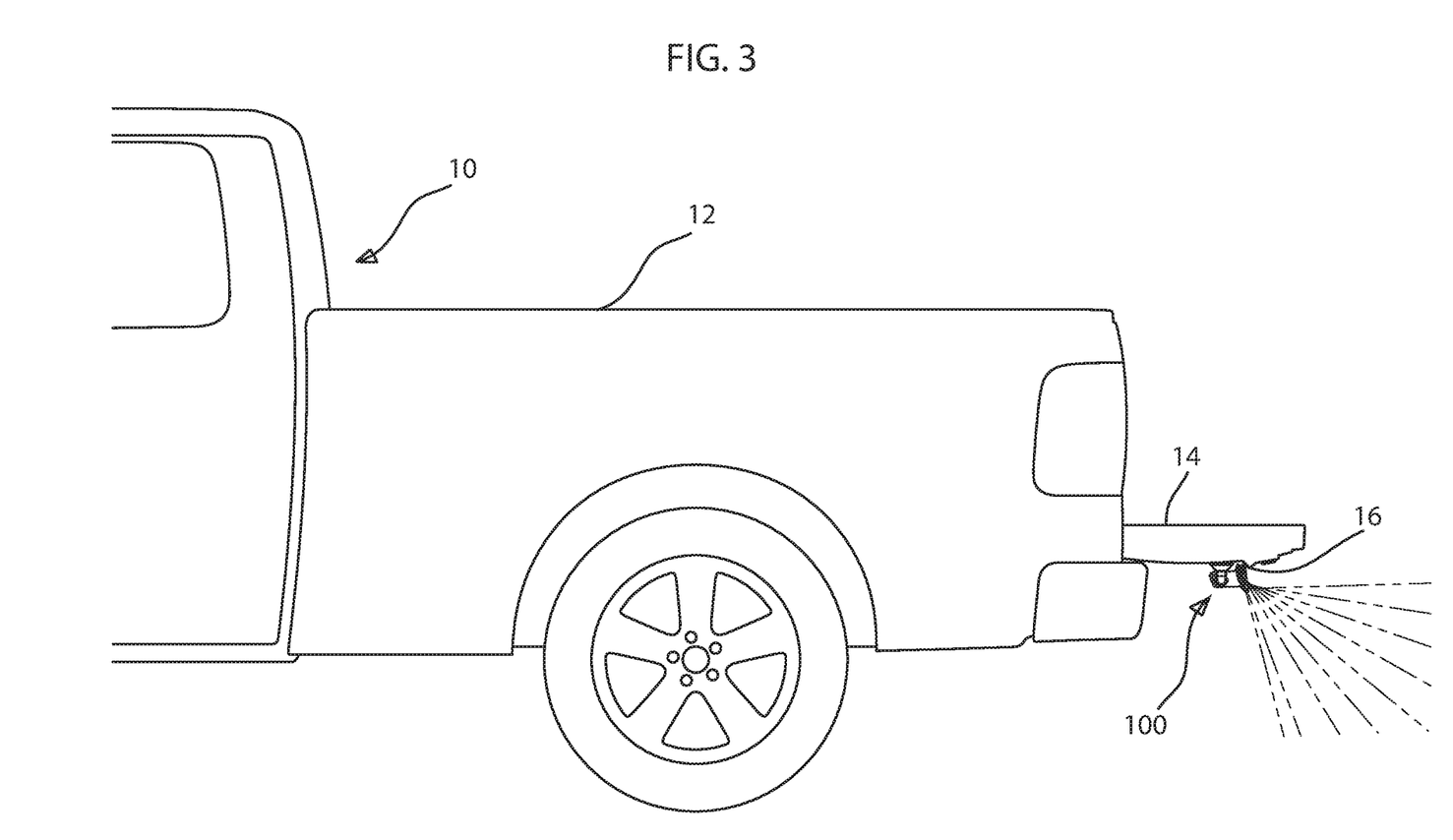
FIG. 3 illustrates a side view of the backup camera enabling device mounted on the tailgate of a pickup truck, in accordance with an embodiment of the present invention.

FIG. 3 illustrates an example of a pickup truck 10 that includes body 12, tailgate 14, backup camera 16 and backup camera enabling device 100. FIG. 3 is presented to show the projection of the backup camera 16 while the tailgate 14 is in the down position while using the backup camera enabling device 100. The backup camera enabling device 100 redirects the image of the backup camera 16 so it is functional while the tailgate 14 is in the down position. The dotted lines represent the camera's projection redirected by the device.

Figure 4:
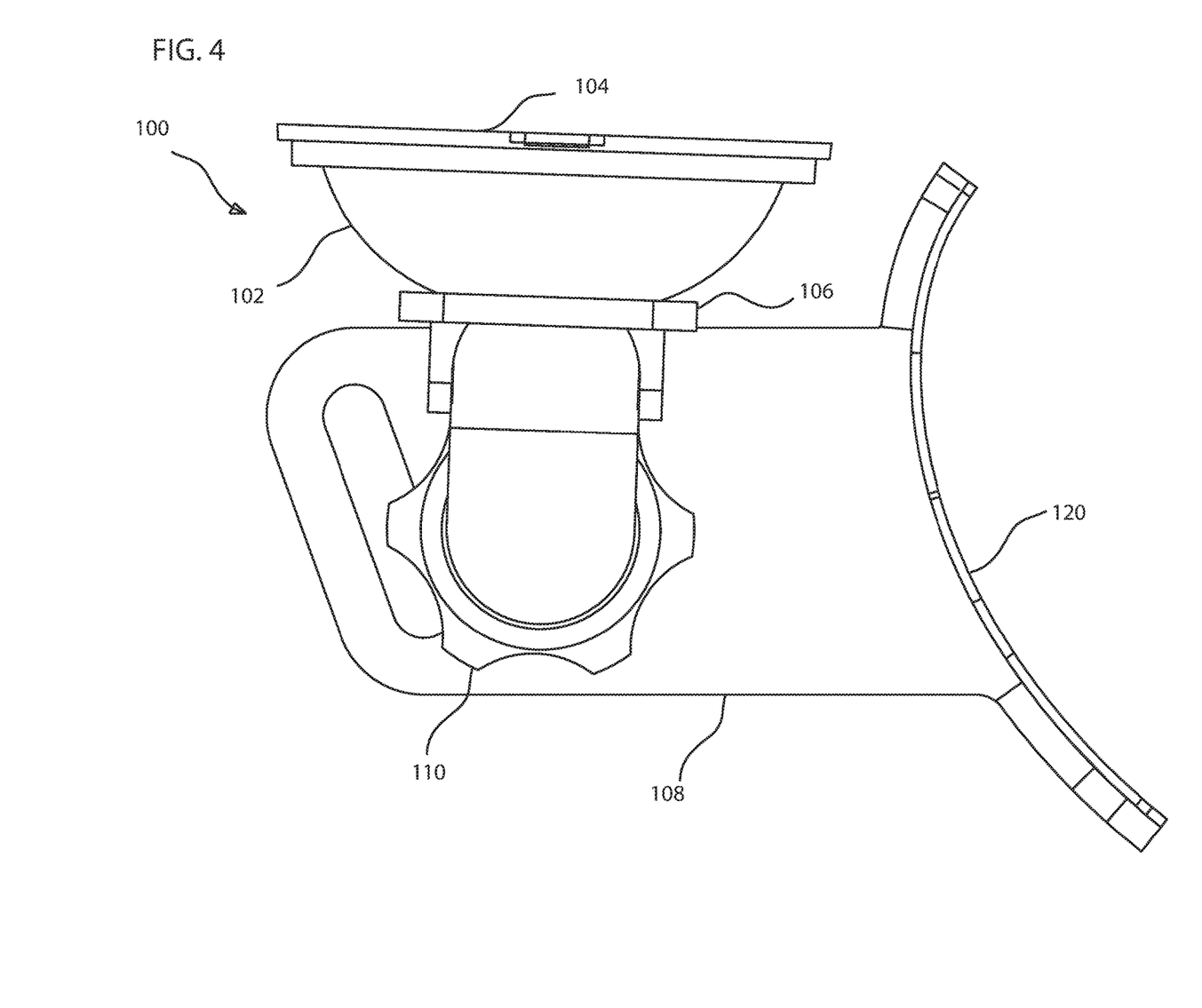
FIG. 4 illustrates a side view of the backup camera enabling device showing greater detail, in accordance with an embodiment of the present invention.

In various embodiments, backup camera enabling device 100 can be attached to the tailgate 14 in a number of ways. FIG. 4 illustrates a side view of the backup camera enabling device 100 and is presented to show the backup camera enabling device 100 in greater detail. In this configuration the mounting bracket 102 utilizes a suction cup 104 to mount the backup camera enabling device 100 to the tailgate 14 (not shown). The mounting bracket 102 serves as a support base and can be constructed from plastic or other suitable materials. The suction cup 104 is attached in a typical manner by engaging the suction cup lever 106. The mounting bracket 102 can also be attached to the tailgate 14 (not shown) using such things as adhesive tape, magnets, hook and loop, or any other type of fastening material suitable for the purposes described herein.

Figure 5:
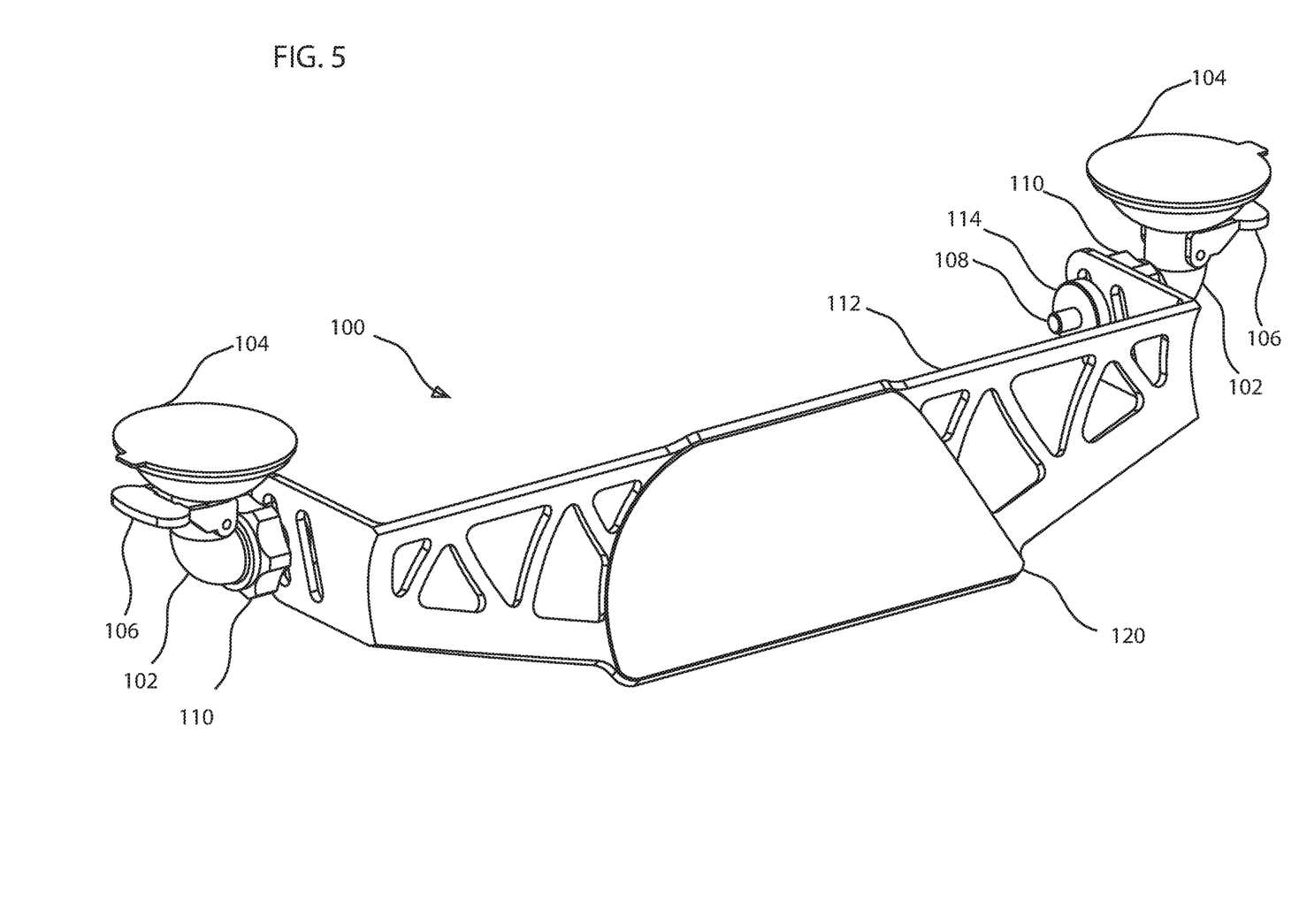
FIG. 5 illustrates a perspective view of the backup camera enabling device showing greater detail, in accordance with an embodiment of the present invention.

FIG. 5 illustrates a perspective view of the backup camera enabling device 100 and is presented to show the backup camera enabling device in greater detail. In this configuration the mounting bracket 102 utilizes a suction cup 104 to mount the backup camera enabling device 100 to the tailgate 14 (not shown). The mounting bracket 102 serves as a support base and can be constructed from plastic or other suitable materials. The suction cup 104 is attached in a typical manner by engaging the suction cup lever 106. The mounting bracket 102 can also be attached to the tailgate 14 using such things as adhesive tape, magnets, hook and loop, or any other type of fastening material suitable for the purposes described herein.

The mounting bracket 102 is coupled to an adjuster pin 108 with a mechanical assembly secured with adjuster nut 110. The adjuster pin 108 is coupled to the mirror frame 112 with a mechanical assembly and secured with adjuster clamp 114. The mirror frame 112 is attached to the mirror 120 with an adhesive. The mirror frame 112 can also be attached to the mirror 120 using such things as adhesive tape, hook and loop, clamps, snaps or any other type of fastening suitable for the purposes described herein.

Figure 6:
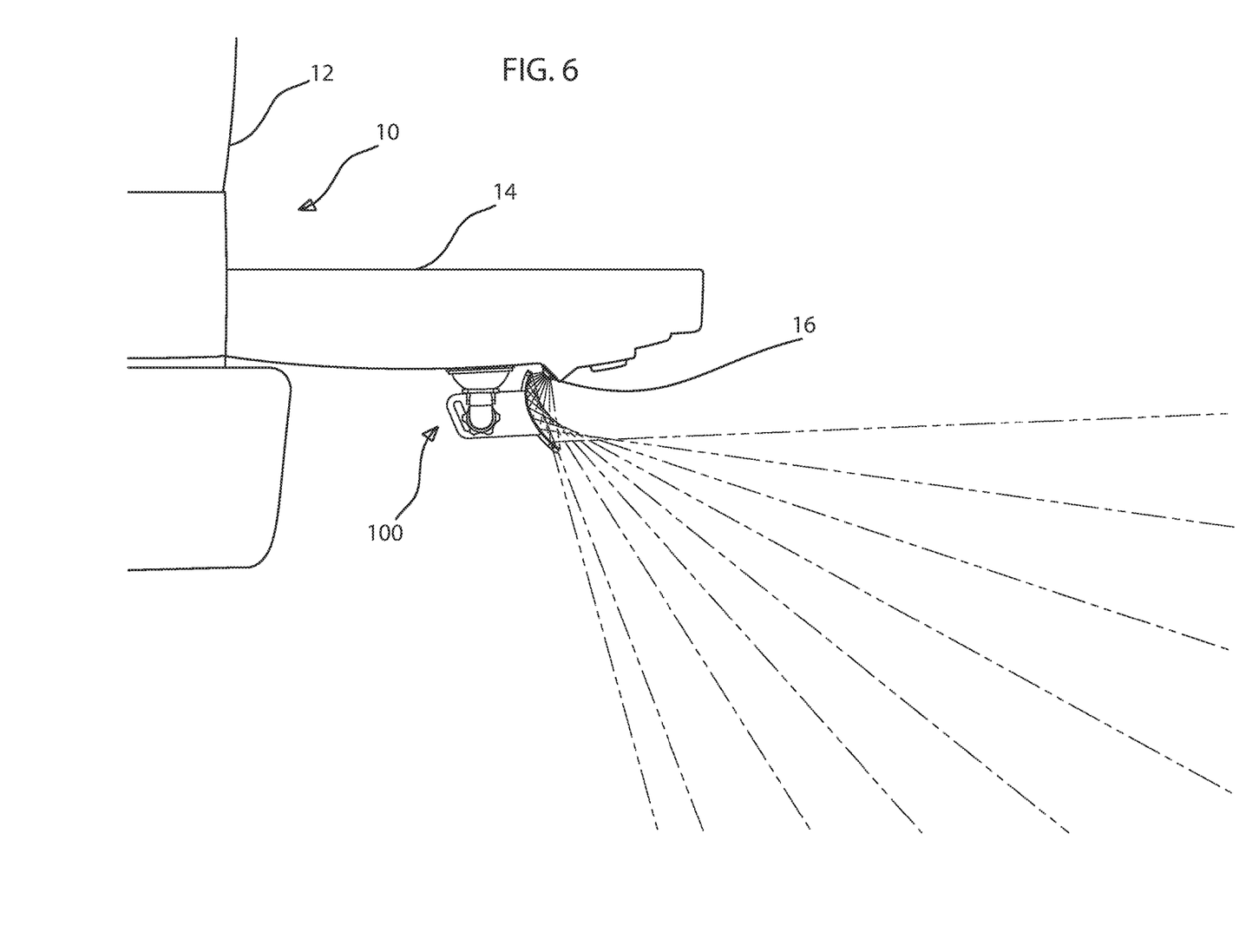
FIG. 6 illustrates a side view of the backup camera enabling device mounted on the tailgate of a pickup truck showing greater detail, in accordance with an embodiment of the present invention.

FIG. 6 illustrates a side view showing greater detail of the backup camera enabling device 100 mounted on the tailgate 14 of a pickup truck 10 that includes body 12, while the tailgate 14 is in the down position. The backup camera enabling device 100 redirects the image of the backup camera 16 so it is functional while the tailgate 14 is in the down position. The image from the backup camera 16 needs to be mirrored so it is pointed toward the back of the pickup truck 10. A concave mirror 120, prism, lens, or any combination of these may be utilized to correct the orientation of the image. Additionally, a tethering mechanism (not shown) may be utilized should the backup camera enabling device 100 become dislodged from the tailgate 14 while the pickup truck 10 is in operation. The dotted lines represent the camera's projection through the device.

The backup camera enabling device 100 requires no wiring. The result is a simple to install add-on device that allows the backup camera 16 to work while the tailgate 14 is in the down position.

Figure 7:
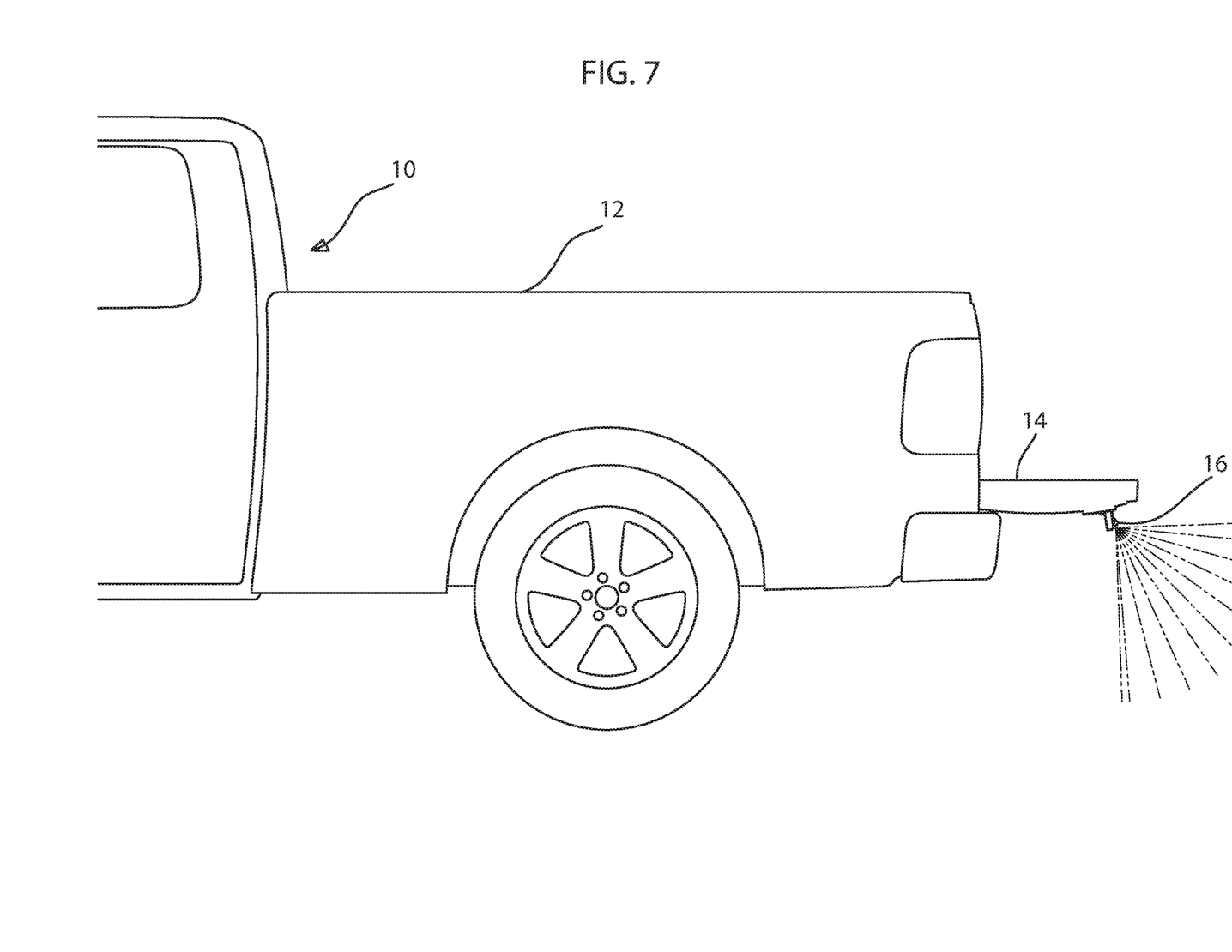
FIG. 7 illustrates a side view of the backup camera with changed position mounted on the tailgate of a pickup truck, in accordance with an embodiment of the present invention.

In another embodiment, backup camera 16 can be mounted to a mechanism that allows the camera 16 to change position. FIG. 7 illustrates an example where backup camera 16 can change position when the tailgate 14 is in the down position. The mechanism moving the camera in the right position can be manual, mechanical, or any other type of system suitable for the purposes described herein.

Figure 8:
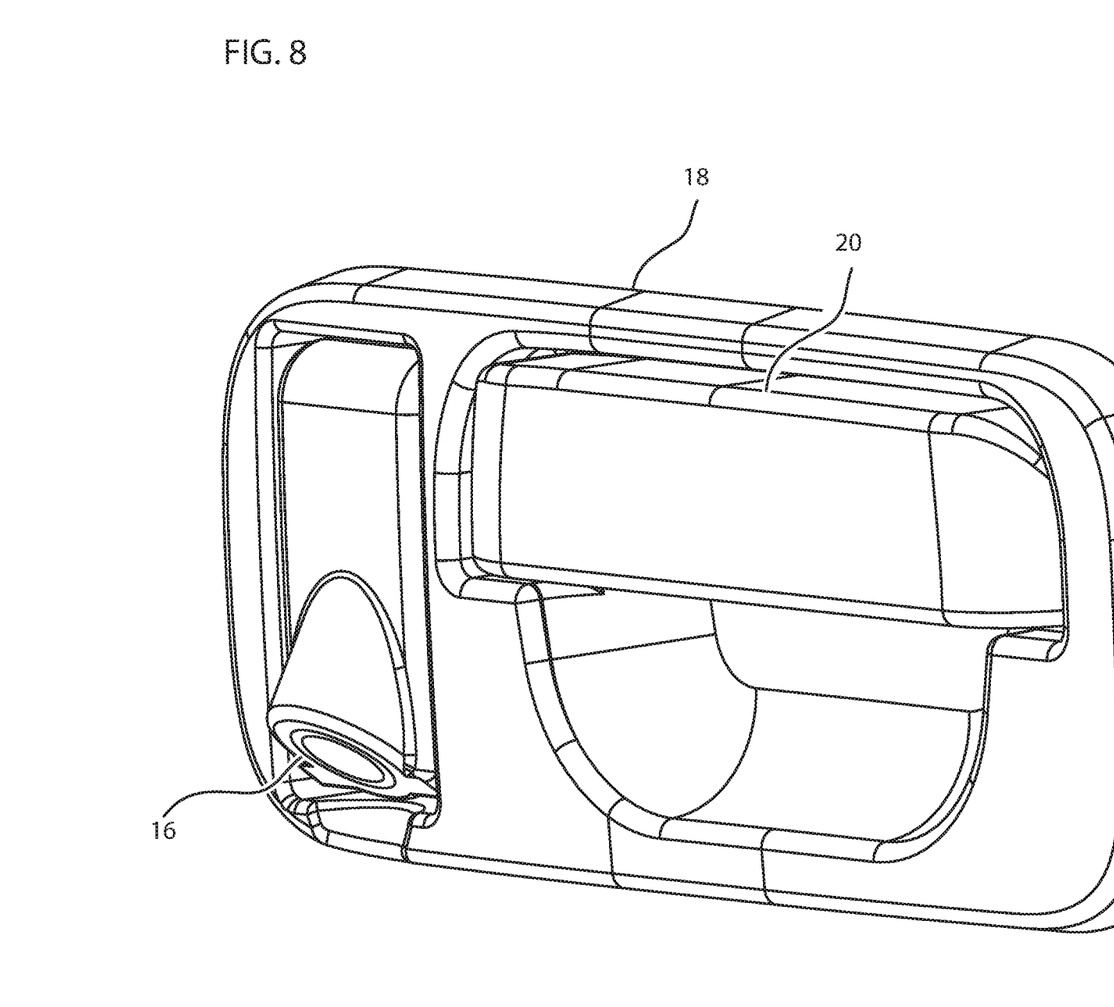
FIG. 8 illustrates a perspective view of the backup camera where the tailgate would be in the up position showing greater detail, in accordance with an embodiment of the present invention.

FIG. 8 illustrates a perspective view of the backup camera 16 while the tailgate 14 (not shown) is in the up position. Backup camera 16 mounted to a mechanism that allows the backup camera 16 to change position and is presented to show the backup camera 16 in greater detail. The backup camera 16 is coupled to the bezel 18 with a mechanical assembly. The mechanism moving the camera in the right position can be manual, mechanical, or any other type of system suitable for the purposes described herein. The bezel 18 may include handle 20 to open the tailgate 14 (not shown).

Figure 9:
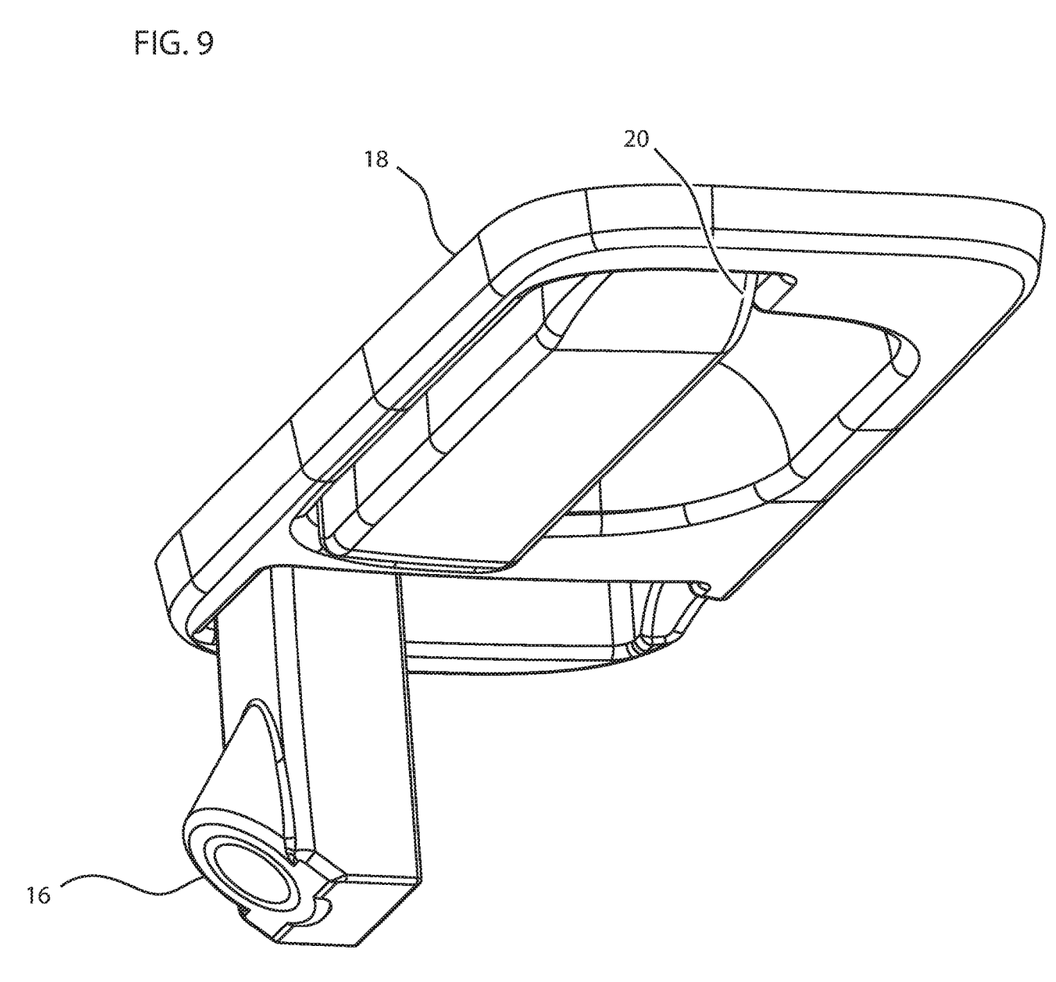
FIG. 9 illustrates a perspective view of the backup camera where the tailgate would be in the down position showing greater detail, in accordance with an embodiment of the present invention.

FIG. 9 illustrates a perspective view of the backup camera 16 while the tailgate 14 (not shown) is in the down position. Backup camera 16 mounted to a mechanism that allows the backup camera 16 to change position and is presented to show the backup camera 16 in changed position in greater detail. The backup camera 16 is coupled to the bezel 18 with a mechanical assembly. The mechanism moving the camera in the right position can be manual, mechanical, or any other type of system suitable for the purposes described herein. The bezel 18 may include handle 20 to open the tailgate 14 (not shown).

From the foregoing description, it should be apparent that the inventive subject matter provides functions, features, and advantages not previously found with backup cameras.

The apparatus, methods, and system of the inventive subject matter have been described with respect to the embodiments in the form disclosed. Accordingly, it is to be understood that the foregoing description is not intended to be limiting or restrictive. It will be appreciated that variations within the spirit of the inventive subject matter will be apparent to those of skill in the art, and the inventive subject matter should not be regarded as limited to any particular embodiment.

The invention claimed is:

1. A rearview camera enabling device for a pickup truck comprising:
    an optical system for redirecting the light towards a backup camera present on the tailgate of the pickup truck when the tailgate is in the down position, making the backup camera functional while the tailgate of the pickup truck is in the down position;
    an attachment assembly for attachment of the optical system;
    an adjustment assembly for adjustment of the optical system if needed;
    a mounting assembly that allows a user to attach the rearview camera enabling device to the tailgate of a pickup truck when the tailgate is in the down position and allow the user to remove the device when the tailgate is in the up position.

2. A rearview camera enabling device for a pickup truck of claim 1, wherein said optical system contains a reflective element, a prism, a lens or any combination.

3. A rearview camera enabling device for a pickup truck of claim 2, wherein the reflective element has a concave shape.

4. A rearview camera enabling device for a pickup truck of claim 1, wherein said mounting assembly includes a suction cup, magnet, adhesive tape, hook and loop, or any other type of fastening material suitable for the purpose as is described herein to attach to the tailgate.

5. A rearview camera enabling device for a pickup truck of claim 1, wherein said attachment assembly includes a suction cup, magnet, adhesive tape, hook and loop, or any other type of fastening material suitable for the purpose as is described herein.

* * * * *